United States Patent

[11] 3,575,642

[72] Inventors Louis M. Puster
Knoxville;
Harold G. Brakebill, Concord; Frank
Payne, Knoxville, Tenn.
[21] Appl. No. 815,876
[22] Filed Apr. 14, 1969
[45] Patented Apr. 20, 1971
[73] Assignee Robertshaw Controls Company
Richmond, Va.

[54] ELECTROPNEUMATIC CONTROL SYSTEM AND
CIRCUIT MEANS AND VALVE MEANS THEREFOR
OR THE LIKE
12 Claims, 3 Drawing Figs.
[52] U.S. Cl...................................................... 317/153,
137/85, 251/30
[51] Int. Cl..................................................F16k 31/02,
H01h 47/36
[50] Field of Search.......................................... 317/153;
137/85, 86; 251/30, 129, 137

[56] References Cited
UNITED STATES PATENTS
| | | | |
|---|---|---|---|
| 3,080,878 | 3/1963 | Dustin et al.................. | 137/85 |
| 3,155,104 | 11/1964 | Hilgert.......................... | 137/85 |
| 3,320,602 | 5/1967 | Andrews....................... | 317/153 |

Primary Examiner—Robert K. Schaefer
Assistant Examiner—William J. Smith
Attorneys—Auzville Jackson, Jr., Robert L. Marben and
Candor, Candor & Tassone ABSTRACT: A valve means for interconnecting a pneumatic source to a pneumatically controlled device in relation to a pneumatic condition in a pilot chamber of the valve means that has a leak port controlled by a flapper valve member having an armature portion thereof responsive to the current flow through two electrical coils disposed on opposite sides thereof and respectively forming collector resistors for an electrical amplifier that is fed signals from the output means of an electrical bridge circuit that has temperature-sensing means disposed in the legs thereof.

INVENTORS
LOUIS M. PUSTER
HAROLD G. BRAKEBILL
FRANK PAYNE

BY
Cauden & Cauden

THEIR ATTORNEYS

ELECTROPNEUMATIC CONTROL SYSTEM AND CIRCUIT MEANS AND VALVE MEANS THEREFOR OR THE LIKE

This invention relates to an electropneumatic control system as well as to an improved valve means and electrical circuit therefor or the like.

It is well known that a pneumatically operated valve means can be utilized to control the degree of interconnection between a pneumatic source and a pneumatically operated heat exchanger device to tend to maintain the output effect of such a device at a selected temperature effect by varying the pressure in a pilot chamber of the valve means in response to sensed temperature conditions, the valve means having a leak port interconnected to the pilot chamber with the leak port being controlled by a movable flapper valve member which has its position controlled by electrically operated means. For example, the flapper valve member can be influenced by the positioning of an armature relative to electrical coil means having the current flow therethrough changed by temperature-sensing means.

Accordingly, it is a feature of this invention to provide such an electropneumatic control system wherein the flapper valve member of this invention has a part thereof forming an armature for the coil means with the coil means of this invention forming part of an electrical amplifier means influenced by an electrical bridge circuit having temperature-sensing means therein.

In particular, one embodiment of this invention disposes the coil means on opposite sides of the armature part of the flapper valve member with the coil means respectively providing collector resistor means for a pair of transistors that have their bases interconnected to the output points of an electrical bridge whereby temperature changes change the voltage at the output points of the bridge and thereby change the bias of the transistors so as to change the current flow through electrical coils.

Accordingly, it is an object of this invention to provide an improved electropneumatic control system having one or more of the novel features set forth above or hereinafter shown or described.

Another object of this invention is to provide an improved electrical circuit for such a control system or the like.

Another object of this invention is to provide an improved valve means for such a control system or the like.

Other objects, uses and advantages of this invention are apparent from a reading of this description which proceeds with reference to the accompanying drawings forming a part thereof and wherein.

Figure 1:
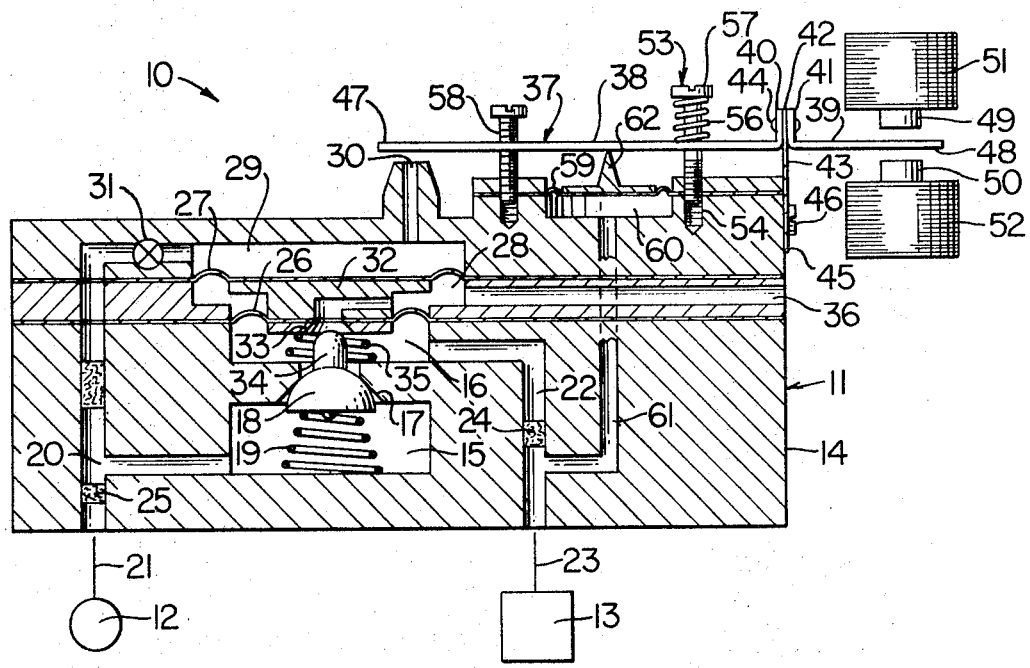
FIG. 1 is a schematic view of the control system of this invention with the valve means being in cross section.

While the various features of this invention are hereinafter described and illustrated as being particularly adaptable for controlling a heat-exchanging device, it is to be understood that various features of this invention can be utilized singly or in any combination thereof to provide control means for other systems as desired.

Therefore, this invention is not to be limited to only the embodiment illustrated in the drawings, because the drawings are merely utilized to illustrate one of the wide variety of uses of this invention.

Referring now to FIG. 1, an improved electropneumatic control system of this invention is generally indicated by the reference numeral 10 and comprises a valve means 11 adapted to control the degree of interconnection between a pneumatic pressure source 12 and a pneumatically operated heat exchanger 13 in relation to a selected temperature effect for the heat exchanger means 13 in a manner hereinafter described.

The valve means 11 of this invention comprises a housing means 14 formed from a plurality of parts to define a first chamber 15 interconnected to a second chamber 16 by a valve seat 17 adapted to be opened and closed by a valve member 18 normally urged to its closed position by a compression spring 19 disposed in the chamber 15.

The chamber 15 is interconnected by suitable passage means 20 in the housing means 14 to the pneumatic source 12 by interconnecting external conduit means 21. Similarly, the chamber 16 is interconnected by passage means 22 in the housing means 14 to the pneumatically operated heat exchanger means 13 by interconnecting external conduit means 23, the passage means 22 having suitable porous filter means 24 therein in advance of the pneumatically operated heat exchanger means 13 while the passage means 20 has similar filter means 25 in advance of the chamber 15.

A pair of flexible diaphragms 26 and 27 are carried by the housing means 14 and cooperate therewith to define a chamber 28 between the diaphragms 26 and 27, the lower diaphragm 26 cooperating with the housing means 14 to define part of the previously described chamber 16 while the upper diaphragm 27 cooperates with the housing means 14 to define a pilot chamber 29 that is interconnected to the atmosphere by a leak port 30 and to the passage means 20 that has a restrictor means 31 therein intermediate the chamber 15 and the pilot chamber 29 for a purpose hereinafter described. The diaphragms 26 and 27 have a valve seat member 32 interconnected thereto so as to be moved thereby, the valve seat member 32 having a valve seat 33 that leads from the chamber 16 to the chamber 28 and is adapted to be opened and closed by a small valve member 34 carried by the larger valve member 18. A compression spring 35 is disposed in the chamber 16 and normally urges the valve seat member 32 upwardly away from the valve member 34. The chamber 28 between the diaphragms 26 and 27 is interconnected to the atmosphere by a passage means 36 formed in the housing means 14.

A flapper valve member 37 of this invention is carried by the housing means 14 and comprises two parts 38 and 39 having adjacent ends 40 and 41 bent at right angles relative thereto and receiving an upper end 42 of a leaf spring 43 therebetween to be secured together in stacked relation by suitable fastening means 44 whereby the valve member parts 38 and 39 are disposed in aligned relation. The lower end 45 of the leaf spring 43 is secured to the housing means 14 by suitable fastening means 46.

The part 38 of the flapper valve member 37 has its free end 47 disposed in aligned relation with the leak port 30 while the part 39 of the flapper valve member 37 has its free end 48 providing an armature part disposed between the core means 49 and 50 of a pair of electrical coils 51 and 52 disposed in spaced relation on opposite sides of the armature part 39, of the flapper valve member 37. An adjusting member 53 is threadedly received in a threaded bore 54 formed in the housing means 14 and passes through an elongated slot 55 in the flapper valve member 37. A compression spring 56 is telescoped about the fastening member 53 between the upper side of the part 38 and an enlarged head 57 of the adjusting member 53 whereby the compression spring 56 tends to normally pivot the flapper valve member 37 in a counterclockwise direction about the point 43 thereof in FIGS. 1 and 2. In this manner, the position of the free end 47 of the flapper valve member 37 can be adjusted relative to the leak port 30 to provide a constant pneumatic pressure in the pilot chamber 29 when the flapper valve member 37 is not being influenced by the coil means 51 and 52 as will be apparent hereinafter, such as during an electrical power failure or the like. A threaded adjusting member 58 passes through a clearance opening 58' in the part 38 of the flapper valve member 37 and is threaded into the housing 14 whereby the head of the screw 58 provides an adjustable stop means to limit the amount of clockwise movement of the flapper valve means 37 relative to the coil means 51 and 52.

Another diaphragm 59 is carried by the housing means 14 to define a feedback chamber 60 therewith, the feedback chamber 60 being interconnected by passage means 61 formed in the housing means 14 and leading to the output passage means 22 that leads to the pneumatically operated heat exchanger means 13. The diaphragm 59 carries an abutment means 62 for engaging against the lower side of the flapper valve member 37 for a purpose hereinafter described.

Figure 2:
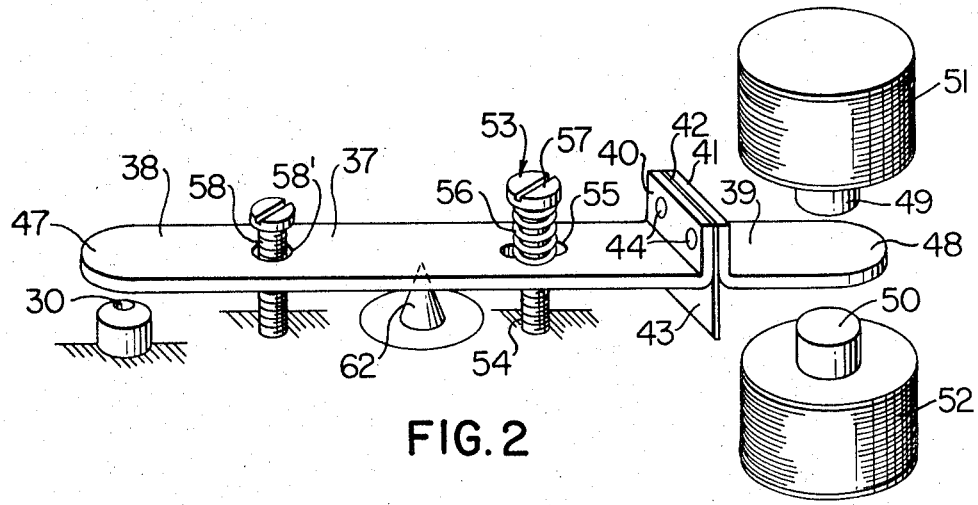
FIG. 2 is a fragmentary, top perspective view of the valve means of FIG. 1.
Figure 3:
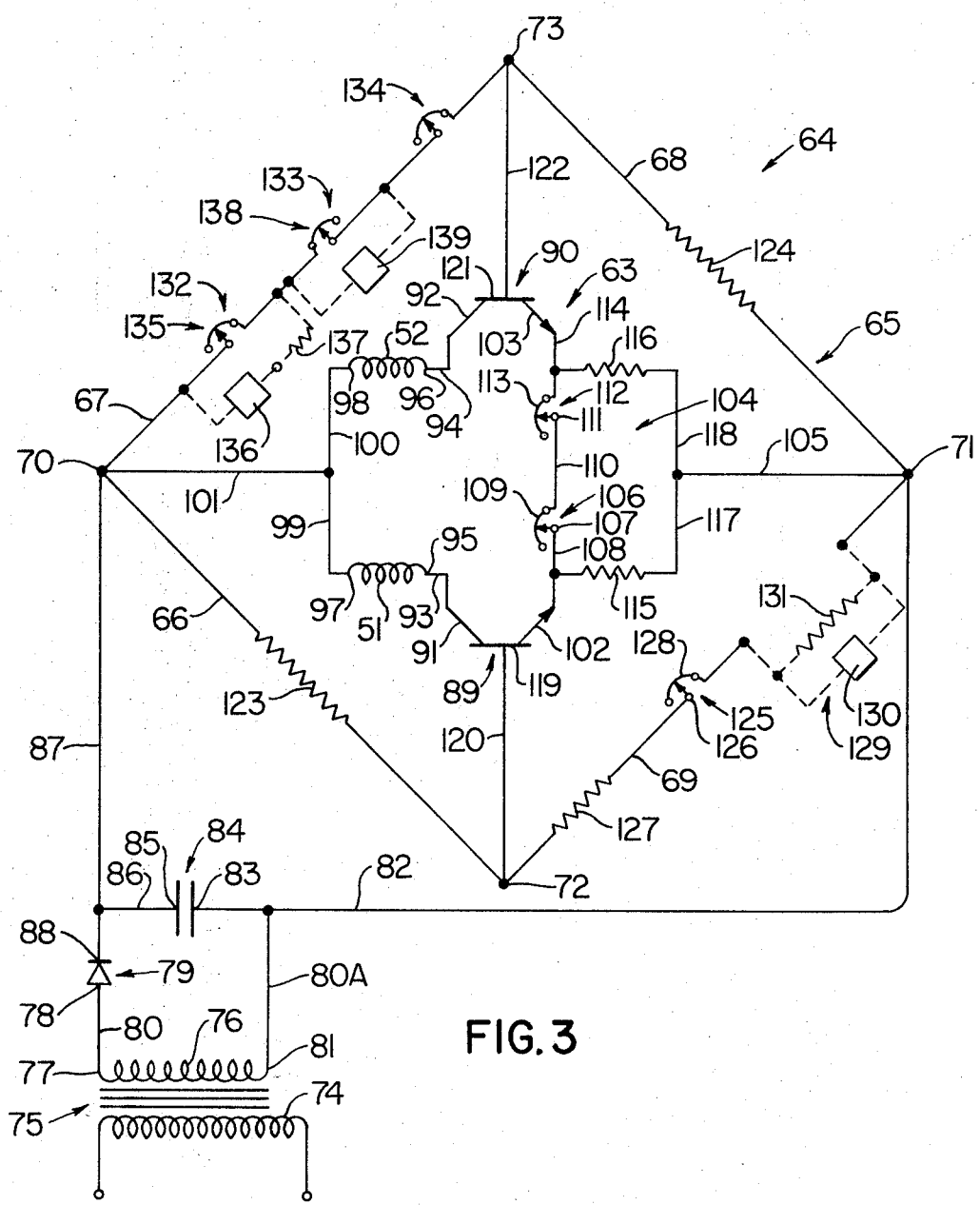
FIG. 3 is a circuit diagram illustrating the circuit means of this invention for the control system of FIG. 1.

The electrical coils 51 and 52 illustrated in FIGS. 1 and 2 form part of an electrical amplifier 63 of this invention that is illustrated in FIG. 3 and defines part of the electrical circuit means 64 of this invention which is now to be described.

As illustrated in FIG. 3, the electrical circuit means 64 also includes an electrical bridge 65 having four legs or arms 66, 67, 68, and 69 with the junction point 70 between the legs 66 and 67 forming one input point for the bridge 65 and the opposed junction point 71 between the legs 68 and 69 forming the other input point for the bridge 65. The junction point 72 between the legs 66 and 69 forms one output point for the bridge 65 while the junction point 73 between the legs 67 and 68 form an opposed output point for the bridge 65.

A suitable alternating current power source is adapted to be interconnected to the primary winding 74 of a transformer 75 having a secondary winding 76 that is interconnected at one side 77 thereof to one side 78 of a half-wave rectifier means 79 by a lead 80. The other side 81 of the winding 76 is interconnected by a lead 80A to a lead 82 that is interconnected to the input point 71 of the bridge 65 at one end thereof and to one side 83 of a filtering capacitor 84. The other side 85 of the capacitor 84 is interconnected by a lead 86 to a lead 87 that is interconnected at one end thereof to the side 88 of the rectifier means 79 and its other end thereof to the input point 70 of the bridge 65.

The amplifier 63 includes a pair of transistors 89 and 90 respectively having the collector sides 91 and 92 thereof interconnected by respective leads 93 and 94 to sides 95 and 96 of the electrical coil means 51 and 52. The other sides 97 and 98 of the coil means 51 and 52 are interconnected together in parallel relation by leads 99 and 100 to a lead 101 that is interconnected to the input point 70 of the bridge 65 whereby the point 70 provides not only an input means for the bridge 65, but also the point 70 provides an input means for the amplifier 63.

The emitter sides 102 and 103 of the transistors 89 and 90 are respectively interconnected in parallel relation to a a gain control 104 that is interconnected by a lead 105 to the input point 71 of the bridge 65 whereby the input point 71 of the bridge 65 also provides an output means for the amplifier 63.

The gain control means 104 includes a throttling range rheostat 106 having one side 107 interconnected by a lead 108 to the emitter side 102 of the transistor 89 and the other side 109 interconnected by a lead 110 to one side 111 of another throttling range rheostat 112. The other side 113 of the rheostat 112 is interconnected by a lead 114 to the emitter side 103 of the transistor 90. The leads 108 and 114 of the gain control 104 are respectively interconnected to resistors 115 and 116 interconnected in parallel relation respectively to the lead 105 by leads 117 and 118.

The base 119 of the transistor 89 is interconnected by a lead 120 to the output point 72 of the bridge 65. Similarly, the base 121 of the transistor 90 is interconnected by a lead 122 to output point 73 of the bridge 65.

The leg 66 of the bridge 65 includes a fixed series resistor 123 while the opposed leg 68 includes a fixed series resistor 124 therein.

The sensing leg 69 of the bridge 65 has a temperature effect selector or a set point selector 125 therein which comprises a variable rheostat having one side 126 thereof interconnected to the output point 72 of the bridge 65 by a fixed series resistor 127. The other side 128 of the rheostat 125 is interconnected to a wall or room thermostat means 129 having a thermistor element 130 and a compensating resistor 131 in shunt therewith whereby the thermostat means 129 is disposed in series relation with the set point rheostat 125.

The other sensing leg 67 of the bridge 65 includes in series an outdoor temperature authority 132, a discharge authority 133 and a calibrating rheostat 134.

The outdoor authority 132 includes a variable resistor or rheostat 135 being shunted by a thermistor element 136 disposed in series relation with a fixed resistor 137. The discharge authority 133 includes a variable resistor or rheostat 138 being shunted by a thermistor element 139.

In this manner, the thermistor element 130 of the sensing leg 69 of the bridge 65 is located so as to be adapted to sense the temperature of the space being conditioned by the output of the pneumatically operated heat-exchanging means 13 while the thermistor element 136 of the sensing leg 67 and the bridge 65 is located to sense outdoor temperature and the thermistor element 139 of the sensing leg 67 is disposed to sense the actual temperature of the output-conditioned air of the heat-exchanging means 13 before the same reaches the space being conditioned thereby. For example, the thermistor element 139 can be located in the output duct of the heat exchanger means 13.

In this manner, it can be seen that the operator or the like can set the set point adjuster or the rheostat 125 at a selected temperature effect which the heat-exchanging means 13 is to maintain in the space being conditioned thereby and being sensed by the thermistor element 130 whereby the operation of the control system 10 of this invention will now be described.

It is assumed that the system 10 is operating at equilibrium and that there is a constant discharge temperature and outdoor temperature whereby the valve means 11 has supplied a correct quantity of pressure fluid to the pneumatically operated heat exchanger means 13 so that the output effect thereof is at the temperature effect previously selected by the selector means 125. Under this condition, the output produced by the bridge 65 at the output points 72 and 73 are in balance so that the bias on the bases 119 and 121 of the transistors 89 and 90 are equal whereby the current flow through the coil means 51 and 52 is identical. Thus, the flapper valve member 37 does not have it position varied by the coils 51 and 52 as the same are exerting constant forces on the armature part 48 of the flapper valve member 37 whereby the pressure in the pilot chamber 29 is constant and the valve member 18 is closed against the valve seat 17 while the valve seat member 32 is closed against the valve member 34.

However, should the temperature effect in the space being conditioned by the heat exchanger means 13 vary from the temperature effect selected by the selector means 125, an unbalanced condition exists at the output points 72 and 73 of the bridge 65 so that a resulting low-voltage differential is imposed by the output points 72 and 73 on the bases 119 and 121 of the transistors 89 and 90 to change the bias thereof so that more current flows through one of the coils 51 or 52 than through the other of the coils 51 or 52 whereby if the coil 51 has a greater current flow therethrough, it will attract the armature 48 with a greater force than the coil 52. Thus, the change in current flow through the coils 51 and 52 in the above manner causes the flapper valve member 37 to pivot in a counterclockwise direction so that the end 47 of the flapper valve member 37 moves closer to the leak port 30 to decrease the degree of interconnection thereof to the atmosphere so that the pressure fluid being directed by the source 12 through the restrictor 31 into the pilot chamber 29 increases in the pilot chamber 29 so as to move the diaphragm 27 and valve member 32 downwardly in FIG. 1 to open the valve member 18 away from the valve seat 17 to increase the flow of pressure fluid into the chamber 16 whereby an increased amount of pressure fluid will be directed to the pneumatically operated heat exchanger means 13 to change the operating condition thereof proportionally to the change of pressure in the pilot chamber 29. However, the increased pressure in the passage means 22 also increases the pressure in the feedback chamber 60 to tend to move the flapper valve member 37 in a clockwise direction to produce a negative feedback to the flapper valve member 37 acting in opposition to the increased force of the coil means 51 tending to move the flapper valve member 37 in a counterclockwise direction so that the immediate corrective action on the heat exchanger means 13 will not be too great.

When the output effect of the heat exchanger 13 again reaches the selected temperature effect, the flapper valve member 37 remains in its new position and the valve member 18 closes against the seat 17 while the valve seat member 32 seats against the valve member 34 to maintain the pressure in the passage 22 and, thus, in the heat exchanger 13.

Conversely, should the temperature effect being produced by the heat exchanger means 13 exceed the temperature effect selected by the set point selector 125, the potential differential at the output points 72 and 73 of the bridge 65 changes the bias on the bases 119 and 121 of the transistors 89 and 90 in such a manner that the flow of current through the coil 52 is greater than through the coil 51 so that the coil 52 pivots the flapper valve member 37 in a clockwise direction to increase the degree of interconnection between the pilot chamber 29 and the atmosphere at the leak port 30. Thus, because of the restriction 31, the pneumatic pressure condition in the chamber 29 decreases so that the valve seat member 32 moves upwardly under the force of the compression spring 35 to move away from the valve member 34 so that the chamber 16 will be vented to the atmosphere through the passage 36 and open valve seat 33.

The decrease in pressure in the chamber 16 correspondingly decreases the pressure in the pneumatically operated heat exchanger means 13 so as to change the operating condition thereof. However, since the pressure also decreases in the feedback chamber 60, the diaphragm 59 opposes the force of the compression spring 56 with a lesser force so the compression spring 56 tends to move the flapper valve member 37 in a counterclockwise direction so that the immediate corrective action of the valve means 11 of the heat exchanger means 13 will not be too great.

Therefore, it can be seen that the adjustment stop 58 can assure a positive airgap between the core 50 of the coil 52 and the armature 48 and the leak port 30 acts as another stop to prevent the armature 48 from positively contacting core 49 of the coil 52 if the adjusting screw 53 is threaded too greatly into the threaded bore 54 during an initial calibration of the valve means 11. The calibration screw 53 can be adjusted until a balanced condition of the bridge circuit 64 results in a midrange branch pressure output of the valve means 11 to the pneumatically operated heat exchanger 13 so that in the case of electrical power failure, the output pressure in the passage 22 will return to a midrange condition returning all control devices to controlled conditions so that the heat exchanger 13 would not adversely affect the temperature condition of the space being conditioned thereby. For example, the source 12 of pressure fluid can be approximately 18—20 p.s.i.g. and the adjusting screw 53 can be adjusted so that in case of electrical power failure, the pneumatic output pressure in the passage means 22 of the valve means 11 would go to its nominal calibrated value, such as 9 or 10 p.s.i.g. which is proper for average load conditions.

Also, it can be seen that the control system 10 of this invention provides a push-pull arrangement on the flapper valve member 37 by the coils 51 and 52 acting on an armature that is part of the leak port flapper valve member 37, the coils 51 and 52 themselves providing collector load resistors for the differential amplifier 63. In this manner, the load resistors 51 and 52 of the amplifier 63 can comprise two high-resistance direct current coils which will supply the necessary force to drive the flapper valve member 37 which allows the bridge 65 to operate from a null-balanced condition. However, even in a null-balanced condition of the bridge 65, current is flowing through the coils 51 and 52 so as to exert force on the flapper valve member 37 at all times to provide a more stable control whereby when a change in the temperature effect in the controlled space deviates from the set point of the selector means 125, the bias on the two transistors 89 and 90 is changed by the low supply voltage of the bridge circuit 65 to provide a high potential voltage change between the collector resistors or coils 51 and 52 of the amplifier 63.

In addition, it can be seen that the control action produced by the control system 10 of this invention can be reversed by simply reversing the leads to the coils 51 and 52 in the amplifier 63.

Accordingly, not only does this invention provide an improved electropneumatic control system or the like, but also this invention provides an improved electrical circuit and valve means therefor or for other devices as desired.

We claim:

1. In a control system having a pneumatic source and a pneumatically operated device to be interconnected to said source by a valve means in relation to a pneumatic condition in a pilot chamber of said valve means that has a leak port leading to said pilot chamber and a movable flapper valve member controlling the opening and closing of said leak port, the improvement comprising electrical coil means arranged to utilize part of said flapper valve member as an armature therefor, and means for changing the electrical current flow through said coil means to move said flapper valve member relative to said leak port in relation to said current flow, said last-named means comprising an electrical bridge circuit having its output means interconnected to an amplifier, said coil means being load resistor means for said amplifier.

2. In a control system having a pneumatic source and a pneumatically operated device to be interconnected to said source by a valve means in relation to a pneumatic condition in a pilot chamber of said valve means that has a leak port leading to said pilot chamber and a movable flapper valve member controlling the opening and closing of said leak port, the improvement comprising electrical coil means arranged to utilize part of said flapper valve member as an armature therefor, and means for changing the electrical current flow through said coil means to move said flapper valve member relative to said leak port in relation to said current flow, said last-named means comprising an electrical bridge circuit having its output means interconnected to an amplifier, said coil means being load resistor means for said amplifier, said coil means comprising two coils disposed on opposite sides of said armature part of said flapper valve member.

3. In a control system as set forth in claim 1, the further improvement wherein said amplifier is disposed across the input means of said electrical bridge.

4. In a control system as set forth in claim 1, the further improvement wherein said amplifier has transistor means therein, said output means of said electrical bridge being interconnected to the base of said transistor means.

5. In a control system as set forth in claim 4, the further improvement wherein said coil means provides collector resistor means for said transistor means of said amplifier.

6. In a control system having a pneumatic source and a pneumatically operated device to be interconnected to said source by a valve means in relation to a pneumatic condition in a pilot chamber of said valve means that has a leak port leading to said pilot chamber and a movable flapper valve member controlling the opening and closing of said leak port, the improvement comprising electrical coil means arranged to utilize part of said flapper valve member as an armature therefor, and means for changing the electrical current flow through said coil means to move said flapper valve member relative to said leak port in relation to said current flow, said last-named means comprising an electrical bridge circuit having its output means interconnected to an amplifier, said coil means being load resistor means for said amplifier, said coil means comprising two coils disposed on opposite sides of said armature part of said flapper valve member, said amplifier having two transistors therein respectively having their bases interconnected to the outlet means of said bridge, said coils respectively providing collector resistors for said transistors.

7. In a control system as set forth in claim 6, the further improvement wherein said amplifier is disposed across the input means of said bridge.

8. In a control system as set forth in claim 7, the further improvement wherein the emitters of said transistors are interconnected together by a gain control means to provide a throttling range control.

9. In a control system as set forth in claim 1, the further improvement wherein said flapper valve member is pivotally mounted to said valve means by a leaf spring.

10. In a control system as set forth in claim 9, the further improvement wherein said flapper valve member comprises two parts interconnected together in aligned relation with said leaf spring being disposed between said two parts.

11. In a control system as set forth in claim 1, the further improvement wherein said amplifier continuously supplies current flow through said coil means even when said bridge circuit is balanced whereby a force is continuously exerted on said flapper valve member by said coil means.

12. In a pneumatically operated valve means having a pilot chamber that controls said valve means in relation to a pneumatic condition in said pilot chamber of said valve means which has a leak port leading to said pilot chamber and a movable flapper valve member controlling the opening and closing of said leak port, the improvement comprising a leaf spring carried by said valve means and being secured to said flapper valve member to pivotally mount said flapper valve member to said valve means intermediate opposed ends of said flapper valve member, one one of said opposed ends being aligned with said leak port for controlling the same and the other of said ends defining an armature for being influenced by electrical coil means to control the pivotal position of said flapper valve member relative to said leak port, said flapper valve member comprising two parts secured together in aligned relation with said leaf spring being disposed between said parts.